United States Patent
Chung et al.

(10) Patent No.: US 7,756,065 B2
(45) Date of Patent: Jul. 13, 2010

(54) DOMAIN NAME SERVICE SYSTEM AND METHOD THEREOF

(75) Inventors: Woon-jae Chung, Gunpo-si (KR);
Hyeong-seok Kim, Seongnam-si (KR);
Hye-young Jung, Seoul (KR);
Song-yean Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1358 days.

(21) Appl. No.: 10/914,202

(22) Filed: Aug. 10, 2004

(65) Prior Publication Data

US 2005/0036501 A1 Feb. 17, 2005

(30) Foreign Application Priority Data

Aug. 11, 2003 (KR) .................. 10-2003-0055534

(51) Int. Cl.
H04L 12/28 (2006.01)
(52) U.S. Cl. .................. 370/255; 370/401; 709/203; 709/241; 707/3
(58) Field of Classification Search ......... 370/254–256, 370/392, 401; 709/201–203, 238, 241, 242, 709/245, 220; 455/456.1; 379/220.01; 707/3
See application file for complete search history.

(56) References Cited

U.S. PATENT DOCUMENTS

| | | | |
|---|---|---|---|
| 6,014,660 A * | 1/2000 | Lim et al. ..................... 707/3 |
| 6,304,913 B1 | 10/2001 | Rune | |
| 6,336,138 B1 | 1/2002 | Caswell et al. | |
| 6,446,108 B1 * | 9/2002 | Rosenberg et al. .......... 709/203 |
| 6,839,421 B2 * | 1/2005 | Ferraro Esparza et al. ..................... 379/220.01 |
| 7,313,631 B1 * | 12/2007 | Sesmun et al. .............. 709/245 |
| 2002/0004846 A1 * | 1/2002 | Garcia-Luna-Aceves et al. .......................... 709/245 |
| 2002/0049762 A1 * | 4/2002 | Shah et al. ..................... 707/10 |
| 2002/0078233 A1 * | 6/2002 | Biliris et al. ................. 709/238 |

(Continued)

FOREIGN PATENT DOCUMENTS

JP 2002-271368 A 9/2002

(Continued)

OTHER PUBLICATIONS

Bhattacharjee, S.; Ammar, M.H.; Zegura, E.W.; Shah, V.; Zongming Fei, "Application-layer anycasting," INFOCOM '97. Sixteenth Annual Joint Conference of the IEEE Computer and Communications Societies. Proceedings IEEE, vol. 3, No., pp. 1388-1396 vol. 3, Apr. 7-12, 1997.*

(Continued)

*Primary Examiner*—Hanh Nguyen
*Assistant Examiner*—Jeffrey M Rutkowski
(74) *Attorney, Agent, or Firm*—Sughrue Mion, PLLC

(57) ABSTRACT

The present invention relates to a domain name service system and method thereof. According to the present invention, a domain name service can be provided through a mobile host and domain name servers having smallest hop counts, based on position information on the domain name servers included in external links. Therefore, a domain name service can be provided within a short time regardless of operating modes of the domain name servers. Furthermore, it is possible to reduce system traffic since the addresses of optimal domain name servers are provided to edge routers.

25 Claims, 14 Drawing Sheets

U.S. PATENT DOCUMENTS

| | | | |
|---|---|---|---|
| 2002/0178238 A1* | 11/2002 | Fletcher et al. | 709/220 |
| 2003/0007482 A1* | 1/2003 | Khello et al. | 370/352 |
| 2003/0079027 A1* | 4/2003 | Slocombe et al. | 709/229 |
| 2003/0101278 A1* | 5/2003 | Garcia-Luna-Aceves et al. | 709/240 |
| 2005/0207394 A1* | 9/2005 | Takeyoshi et al. | 370/351 |

FOREIGN PATENT DOCUMENTS

| | | | |
|---|---|---|---|
| JP | 2003/208371 A | | 7/2003 |
| KR | 2001-0016708 A | | 3/2001 |
| KR | 2001-0076767 A | | 8/2001 |
| KR | 2001-0086381 A | | 9/2001 |
| KR | 2002-0055501 A | | 7/2002 |
| KR | 2003-0015502 A | | 2/2003 |
| WO | WO 03/017615 A1 | | 2/2003 |

OTHER PUBLICATIONS

Engelstad, P.; Thanh, D.V.; Egeland, G., "Name resolution in on-demand MANETs and over external IP networks," Communications, 2003. ICC '03. IEEE International Conference on , vol. 2, No., pp. 1024-1032 vol. 2, May 11-15, 2003.*

Shaikh, A.; Tewari, R.; Agrawal, M., "On the effectiveness of DNS-based server selection," INFOCOM 2001. Twentieth Annual Joint Conference of the IEEE Computer and Communications Societies. Proceedings. IEEE , vol. 3, No., pp. 1801-1810 vol. 3, 2001.*

Metz, C., "IP anycast point-to-(any) point communication," Internet Computing, IEEE , vol. 6, No. 2, pp. 94-98, Mar./Apr. 2002.*

Sarat, S.; Pappas, V.; Terzis, A., "On the Use of Anycast in DNS," Computer Communications and Networks, 2006. ICCCN 2006. Proceedings.15th International Conference on , vol., No., pp. 71-78, Oct. 9-11, 2006.*

Jaehoon Jeong et al., "The autoconfiguration of recursive DNS server and the optimization of DNS name resolution in hierarchical mobile IPv6", Internet Article, Online!, Jul. 5, 2003, pp. 1-4, XP002309435.

Index of /jjeong/publications/international -conference, Jul. 5, 2003, XP002312721.

Jaehoon Jeong et al., "Name service in IPv6 mobile ad-hoc network connected to the internet", Internet Article, Online!, vol. 2, Mar. 10, 2003, pp. 1-5, XP002309436.

Index of/jjeong/publications/international-conference, Mar. 10, 2003, XP002312722.

DNS Discovery Design Team:, "Analysis of DNS Server Discovery Mechanisms for IPv6", Online, Online!, Jul. 12, 2001, pp. 1-42, XP002309437.

Jae-Hoon Jeong, et al., The Autoconfiguration of Recursive DNS Server and the Optimization of DNS Name Resolution in Hierarchical Mobile IP v6, Internet Draft, 2003.

Chinese Office Action issued Jul. 7, 2006 issued in corresponding Chinese Patent Application No. 200410070590.1.

* cited by examiner

FIG.6

|  |  | DNS1 | | DNS2 | | DNS3 | | DNS4 | |
|---|---|---|---|---|---|---|---|---|---|
|  |  | HCgd | Mode | HCgd | Mode | HCgd | Mode | HCgd | Mode |
|  |  | HCdr | R Mode | HCdr | R Mode | HCdr | R Mode | HCdr | R Mode |
| External link 1 | Router1 | 2 | ? | 1 | ? | 1 | ? | 1 | ? |
|  |  | 1 | 6 | 2 | 6 | 3 | 8 | 3 | 8 |
|  | Router2 | 2 | ? | 1 | ? | 1 | ? | 1 | ? |
|  |  | 1 | 6 | 2 | 6 | 3 | 8 | 3 | 8 |
| External link 2 | Router3 | 2 | ? | 1 | ? | 1 | ? | 1 | ? |
|  |  | 4 | 12 | 3 | 8 | 2 | 6 | 2 | 6 |
|  | Router4 | 2 | ? | 1 | ? | 1 | ? | 1 | ? |
|  |  | 4 | 12 | 3 | 8 | 2 | 6 | 2 | 6 |

HC Query:

| Payload Proto | Header Len | MH Type=0x10 | Reserved |
|---|---|---|---|
| Checksum | | M | T |

DNS-SET-REQ:

| Payload Proto | Header Len | MH Type=0x12 | Reserved |
|---|---|---|---|
| Checksum | | Reserved | DNS Num=2 |
| 911 — PRI | | | |
| 912 — SEG | | | |

FIG. 12

DNS-SET-ACK/NACK:

| Payload Proto | Header Len | MH Type=0x13 | Reserved |
|---|---|---|---|
| Checksum | | RVAL | |

921

Modified Router Solicitation:

| Type | Code | Checksum |
|---|---|---|
| Reserved | | |
| Type=6 | Length | Mode=I/R/A |

931

Modified Router Advertisement

| Type | Code | Checksum |
|---|---|---|
| Reserved |||
| Type=7 | Length | Reserved |
| 941 — DNS PRI |||
| 942 — DNS SEC |||

FIG. 18

DNS-CONF-REQ

| Payload Proto | Header Len | MH Type=0x14 | Reserved |
|---|---|---|---|
| Checksum | | Mode=I/R/A | |

DNS-CONF-ACK/NACK

| Payload Proto | Header Len | MH Type=0x15 | Reserved |
|---|---|---|---|
| Checksum | | RVAL | |
| DNS PRI | | | |
| DNS SEC | | | |

961 — DNS PRI
962 — DNS SEC

DOMAIN NAME SERVICE SYSTEM AND METHOD THEREOF

BACKGROUND OF THE INVENTION

This application claims the priority of Korean Patent Application No. 10-2003-0055534 filed on Aug. 11, 2003, in the Korean Intellectual Property Office, the disclosure of which is incorporated herein in its entirety by reference.

1. Field of the Invention

A system and a method consistent with the present invention relates to a domain name system, and more particularly, to a domain name service system and method thereof, wherein if a mobile host moves to an external link, a router connected to the mobile host transmits at least one address of at least one domain name server with the smallest hop count to the mobile host.

2. Description of the Related Art

A general mobile network system is divided into a home sub domain 10 and an external sub domain 20, depending on the locations of mobile hosts 11a and 21a. The mobile network system comprises first and second routers 40 and 50 connected to the home sub domain 10 and the external sub domain 20 via an Internet network 30, and first and second counterpart nodes 60 and 70 that are connected to the first and second routers 40 and 50, respectively, as shown in FIG. 1. Herein, it is assumed that the mobile hosts 11a and 21a are in communication with the first counterpart node 60.

The home sub domain 10 comprises a home link 11 including the mobile host 11a and a home agent 11b for managing the mobile host 11a; a domain name server 13 connected to the home link 11 via a sub network 12; and a gateway 14 connected to the sub network 12 for performing an Internet connection function.

The external sub domain 20 comprises an external link 21, including the mobile host 21a resulting from the movement of the mobile host 11a of the home sub domain 10, an external agent 21b for managing the mobile host 21a and a dynamic host configuration protocol (DHCP) server 21c for automatically configuring the address of the mobile host 21a; a domain name server 23 connected to the external link 21 via a sub network 22; and a gateway 24 connected to the sub network 22 for providing an Internet connection function.

Routers are used for the home agent 11b and the external agent 21b in the same manner as the first and second routers 40 and 50 that are connected to the counterpart nodes 60 and 70, respectively.

The operation of the mobile network system constructed as above will be described below.

In the mobile network system, if the mobile host 11a located at the home link 11 moves and is located at the external link 21, the mobile host 21a receives a message from the external agent 21b, which is different from that transmitted from the home agent 11b. Therefore, the mobile network system recognizes that the mobile host 21a is located at the external link 21 rather than the home link 11.

The mobile host 21a is allocated an address and network information through the DHCP server 21c or provided with a network prefix through the external agent 21b to create a care-of address by itself.

After the allocation of the address has been completed as described above, the mobile host 21a provides its changed address to the first counterpart node 60 and the home link 11 with which it was in communication when it was located at the home link 11. Through the provided address, the home agent 11b and the first counterpart node 60 store and manage the changed address therein.

Thereafter, the mobile host 21a can continuously communicate with the first counterpart node 60 based on the changed address.

The second counterpart node 70 which has not yet detected that the mobile host 21a has moved to the external link 21 sends a packet to the home agent 11b. The home agent 11b that has received the packet resends the packet to the mobile host 21a located at the external link 21 based on the stored address.

Therefore, the mobile host can continuously communicate without disconnection during and after its movement.

As for a domain name service, if the mobile host 11a of the home link 11 has moved to the external link 21, the mobile host 21a resulting from the movement uses a domain server address used in the domain name server 13 of the home sub domain 10.

Therefore, even when the mobile host 11a of the home link 11 has moved to the external link 21, the moved mobile host 21a still requests a domain name service through the domain name server 13 of the home link 11, as indicated by a dotted line 80 in FIG. 2.

However, this causes a problem in that there is a limitation on providing an efficient domain name service due to overload on network traffic since the mobile host 21a receives the domain name service through the domain name server 13 of the home link 11 even though the mobile host has moved from the home link 11 to the external link 21.

SUMMARY OF THE INVENTION

Illustrative, non-limiting embodiments of the present invention overcome the above disadvantages and other disadvantages not described above. However, the present invention is not required to overcome the disadvantages described above, and thus, an illustrative, non-limiting embodiment of the present invention may not overcome any of the problems described above.

Accordingly, it is an exemplary aspect of the present invention to provide a domain name service system and method thereof, wherein a mobile host can select a domain name server capable of providing a domain name service according to a domain where the mobile host is located, so that a domain name service can be quickly provided through the selected domain name server.

Another exemplary aspect of the present invention is to provide a domain name service system and method thereof, wherein a domain name server capable of providing a domain name service can be selected to minimize network traffic, thereby providing an efficient domain name service.

Additional aspects and advantages of the invention will be set forth in part in the description which follows and, in part, will be understood from the description, or may be learned by practice of the invention.

The foregoing and other aspects of the present invention are achieved by providing a domain name service system that requests position information on domain name servers included in an external link of a network, and transmits the position information provided in response to the request to an edge router connected to a mobile host.

The position information may include hop counts between the edge router and the domain name servers and/or hop counts between the domain name servers and a gateway.

The smallest hop counts according to iterative and recursive modes of the domain name servers may be calculated based on the position information, and a domain name server-managing table may be created based on the position information and the calculated hop counts.

Addresses for the iterative and recursive modes of the domain name servers having smallest hop counts with respect to the edge router may be transmitted to the edge router.

In iterative mode, the smallest hop count may be calculated based on:

$$HCi = 2 \times HCgd \times Ldn + 2 \times HCdr,$$

$$DNSSPi = \{Min(HCdr)\} \text{ of } \{Min(HCgd) \text{ lists}\},$$

where HCi is the hop count required in iterative mode, HCgd is the hop count between the gateway and each domain name server, HCdr is the hop count between each domain name server and the edge router, DNSSPi is the smallest hop count in iterative mode, and Ldn is the length of a domain name.

In recursive mode, the smallest hop count may be calculated based on:

$$HCr = 2 \times HCgd + 2 \times HCdr,$$

$$DNSSPr = Min(HCr),$$

where HCr is the hop count required in recursive mode, HCgd is the hop count between the gateway and each domain name server, HCdr is the hop count between each domain name server and the edge router, and DNSSPr is the smallest hop count in recursive mode.

Further, a domain name service system of the present invention is connected between an external link and an Internet network and adapted to collect position information on domain name servers included in the external link.

If a mobile host is located at the external link, the position information may include hop counts between an edge router connected to the mobile host and the domain name servers, and hop counts between the domain name servers and a gateway.

Moreover, in a domain name service system of the present invention, when a mobile host requests a domain name service, addresses of domain name servers having the smallest hop counts with respect to the mobile host are transmitted to the mobile host.

The addresses of the domain name servers may include the addresses of the domain name servers having the smallest hop counts for iterative and recursive modes.

When the mobile host requests the domain name service, the mobile host may make the request while selecting an operating mode of the domain name service.

A domain name service method of the present invention comprises a first step of requesting position information on domain name servers included in a network; and a second step of transmitting position information on domain name servers, which have the smallest hop counts with respect to an edge router connected to a mobile host to the edge router, in response to the request of the first step.

The position information in the first step may include hop counts between the edge router and each domain name server and hop counts between each domain name server and a gateway.

The second step may comprise a first process of transmitting addresses of the domain name servers, which have the smallest hop counts with respect to the edge router, to the edge router; and a second process of allowing the addresses of the domain name servers transmitted in the first process to be cached in the edge router.

The smallest hop counts may be calculated according to operating modes of the domain name servers.

The addresses transmitted to the edge router may include addresses for iterative and recursive modes that are operating modes of the domain name servers.

Furthermore, a domain name service method of the present invention comprises a first step of transferring a request for position information on domain name servers included in an external link; and a second step of collecting and storing the position information on the domain name servers in response to the request of the first step.

The second step may include allowing a gateway connected between the external link and an Internet network to collect and store the position information.

The second step may comprise a first process of, by a sub router for connecting the external link to the gateway, collecting the position information; and a second process of causing the position information collected in the first process to be stored in the gateway.

Moreover, a domain name service method of the present invention comprises a first step of, by a mobile host, requesting a domain name service due to changes in a link to which the mobile host is connected; and a second step of transmitting addresses of domain name servers, which have the smallest hop counts with respect to an edge router connected to the mobile host, to the mobile host, in response to the request of the first step.

The first step may include requesting the edge router connected to the mobile host in the changed link to provide the domain name service.

The second step may comprise a first process of transmitting the addresses of the domain name servers, which have the smallest hop counts with respect to the edge router, to the mobile host in response to the request of the first step; and a second process of causing the addresses transmitted in the first process to be cached in the mobile host.

The first step may comprise a first process of requesting a domain name server, which is included in a first link to which the mobile host was connected before connecting to a second link, to provide the domain name service; and a second process of providing the domain name service through the domain name server in the first process.

The second step may comprise a first process of requesting the edge router, which is included in the second link, to provide the domain name service; a second process of transmitting addresses of domain name servers, which have the smallest hop counts with respect to the edge router of the first process, to the mobile host; and a third process of causing the addresses in the second process to be cached in the mobile host.

BRIEF DESCRIPTION OF THE DRAWINGS

The above and other objects, features and advantages of the present invention will become apparent from the following description of illustrative, non-limiting embodiments given in conjunction with the accompanying drawings, in which:

FIG. 6 shows a domain name server-managing table generated by an address-managing server according to present invention;

FIG. 11 is a view showing the structure of a domain name server address message that is transmitted to an edge router according to present invention;

FIG. 12 is a view showing the structure of a response message of the edge router according to present invention;

FIG. 18 is a view showing the structure of a domain name service request message of the mobile host according to present invention; and FIG. 19 is a view showing the structure of a domain name server address message that is transmitted from the edge router in response to a request of the mobile host according to present invention.

DETAILED DESCRIPTION OF ILLUSTRATIVE, NON-LIMITING EMBODIMENTS OF THE INVENTION

Hereinafter, illustrative, non-limiting embodiments of the present invention will be described in detail with reference to accompanying drawings.

Figure 1:
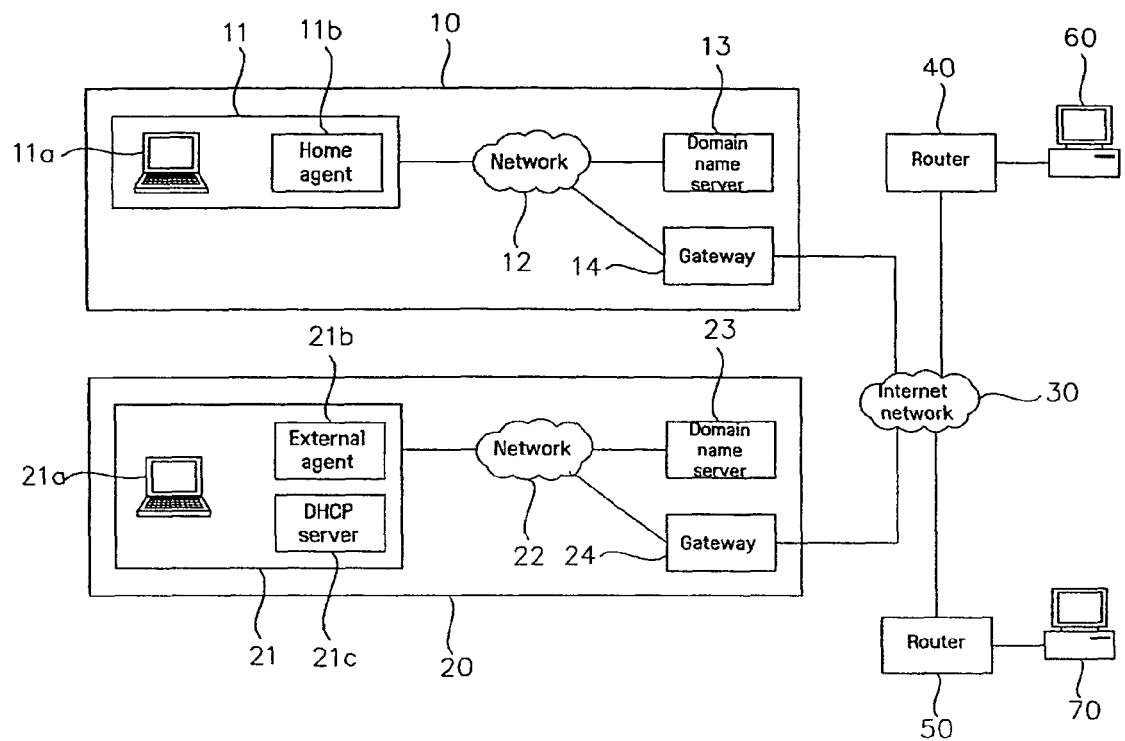
FIG. 1 is a view showing the configuration of a general mobile network.
Figure 2:
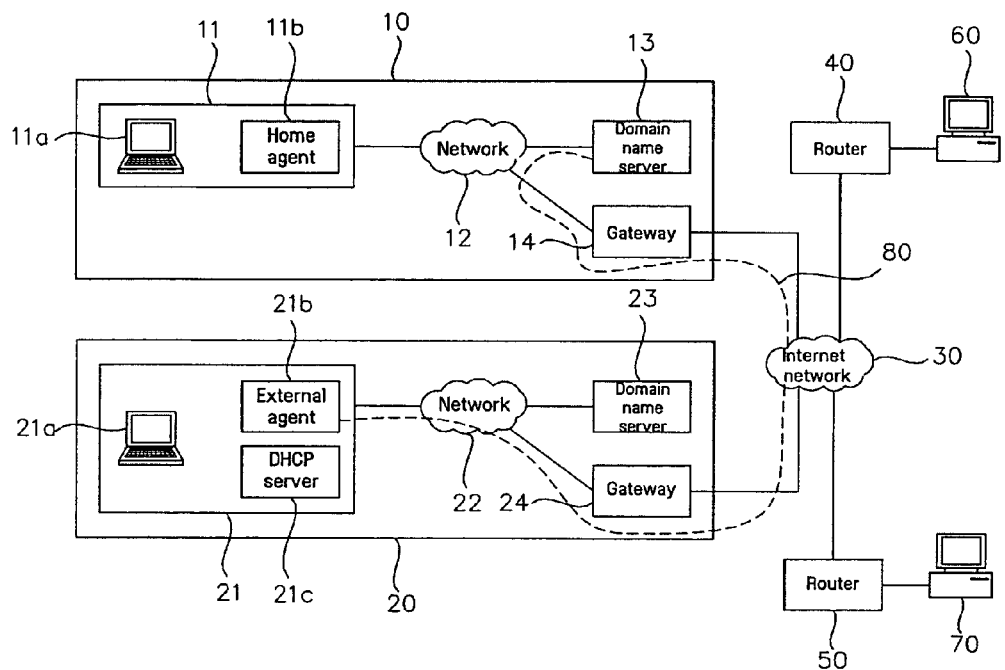
FIG. 2 is a view showing the flow of a conventional domain name service.
Figure 3:
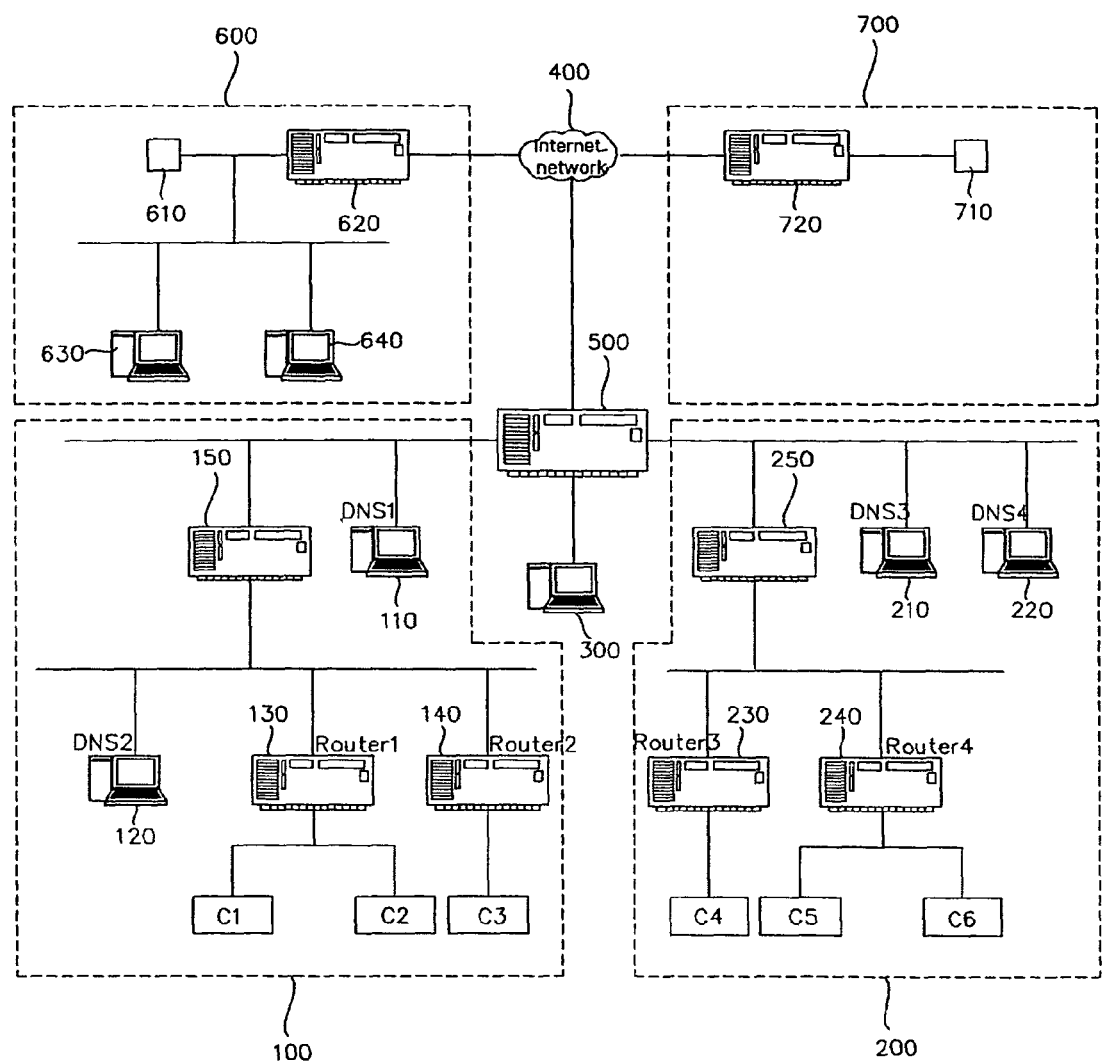
FIG. 3 is a view showing the configuration of a domain name service system according to present invention.

As shown in FIG. 3, a domain name service system according to the present invention comprises an address-managing unit 300 and an address-collecting unit 500. The address-managing unit 300 requests position information on first to fourth domain name servers 110, 120, 210 and 220 that are installed in first and second external links 100 and 200 included in a network, and transmits the requested position information to first to fourth edge routers 130, 140, 230 and 240 connected to mobile hosts. Further, the address-collecting unit 500 collects position information on the domain name servers 110, 120, 210 and 220 included in the first and second external links 100 and 200 in response to the request of the address-managing unit 300 and sends the collected position information to the address-managing unit 300.

A gateway that is connected between the first and second external links 100 and 200 and an Internet network 400, which performs an Internet connection function of the first and second external links 100 and 200, is used for the address-collecting unit 500.

Furthermore, a home link 600 at which a mobile host was initially located and which was connected to the Internet network 400 is still connected to the Internet network 400, and a counterpart link 700 that performed communications through the home link 600 and the Internet network 400 is also still connected to the Internet network 400.

The home link 600 comprises a home agent 610 for managing a mobile host, a home gateway 620 connected to the home agent 610 to perform an Internet connection function of the mobile host, and home domain name servers 630 and 640 for providing the mobile host with a domain name service.

Further, the counterpart link 700 comprises a counterpart node 710 that performs communications with the mobile host, and a counterpart gateway 720 connected between the counterpart node 710 and the Internet network 400 to perform an Internet connection function of the counterpart node 710.

The counterpart node 710 may be an arbitrary mobile host, a server or the like which performs communications with the mobile host.

The first and second external links 100 and 200 comprise first and second sub routers 150 and 250 connected to the address-collecting unit 500, the first to fourth domain name servers 110, 120 and 210, 220 connected to the first and second sub routers 150 and 250, respectively, and the first to fourth edge routers 130, 140 and 230, 240 which are connected to the sub routers 150 and 250 and, if the mobile host of the home link 600 has moved, are to be connected to the moved mobile host of the home link 600, respectively.

Furthermore, one or more cells C1, C2, C3, C4, C5 and C6 are connected to the first to fourth edge routers 130, 140, 230 and 240. The cells C1, C2, C3, C4, C5 and C6 are regions to which communications are relayed by arbitrary stations connected to the first to fourth edge routers 130, 140, 230 and 240.

Further, when the address-managing unit 300 requests position information, the address-collecting unit 500 collects position information containing hop counts between the first to fourth edge routers 130, 140, 230 and 240 and the first to fourth domain name servers 110, 120, 210 and 220 included in the first and second external links 100 and 200, and hop counts between the first to fourth domain name servers 110, 120, 210 and 220 and the address-collecting unit 500. The address-collecting unit 500 transmits the collected position information to the address-managing unit 300.

The address-managing unit 300 creates a domain name server-managing table according to iterative and recursive modes in the first to fourth domain name servers 110, 120, 210 and 220 based on the received position information.

The iterative and recursive modes will be described hereinafter through a domain name service for "www.yahoo.com."

Figure 4:
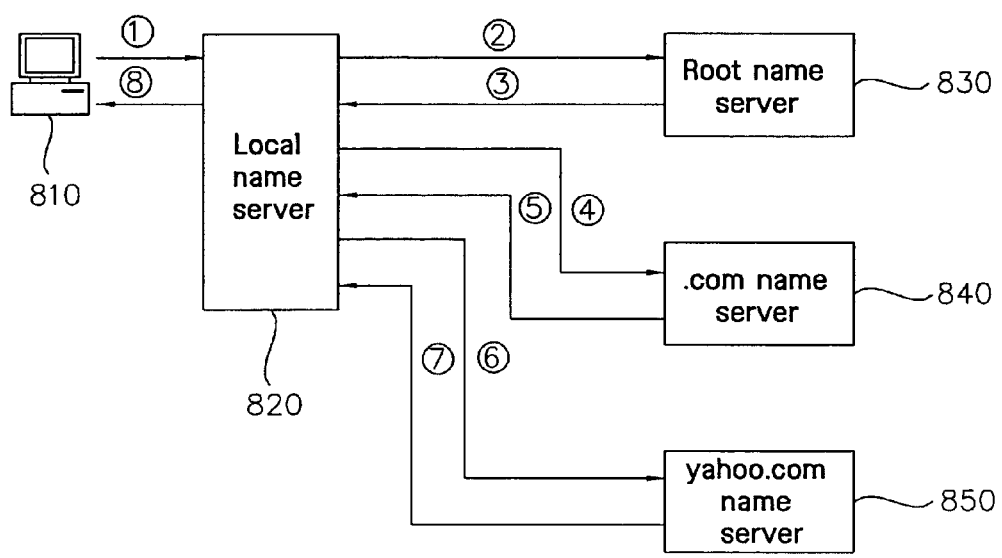
FIG. 4 is a block diagram showing an iterative mode of a domain name service according to present invention.

First, in case of the iterative mode shown in FIG. 4, when a client 810 requests a local name server 820 to provide a domain name service through an IP address or a domain name (①), the local name server 820 requests a root name server 830 to provide a domain name service in reverse order of the domain name (②).

Thereafter, the root name server 830 make a response by informing the local name server 820 of addresses having a requested sub-domain ".com" entry (③). The local name server 820 iteratively requests sub servers 840 and 850 to inform the local name server 820 of an address for the domain name based on the previous sub-domain ".com" domain until an address is acquired (④, ⑤, ⑥, and ⑦). When the local name server 820 that finally acquires the address, it sends the IP address of the domain name to the client 810 (⑧).

Figure 5:
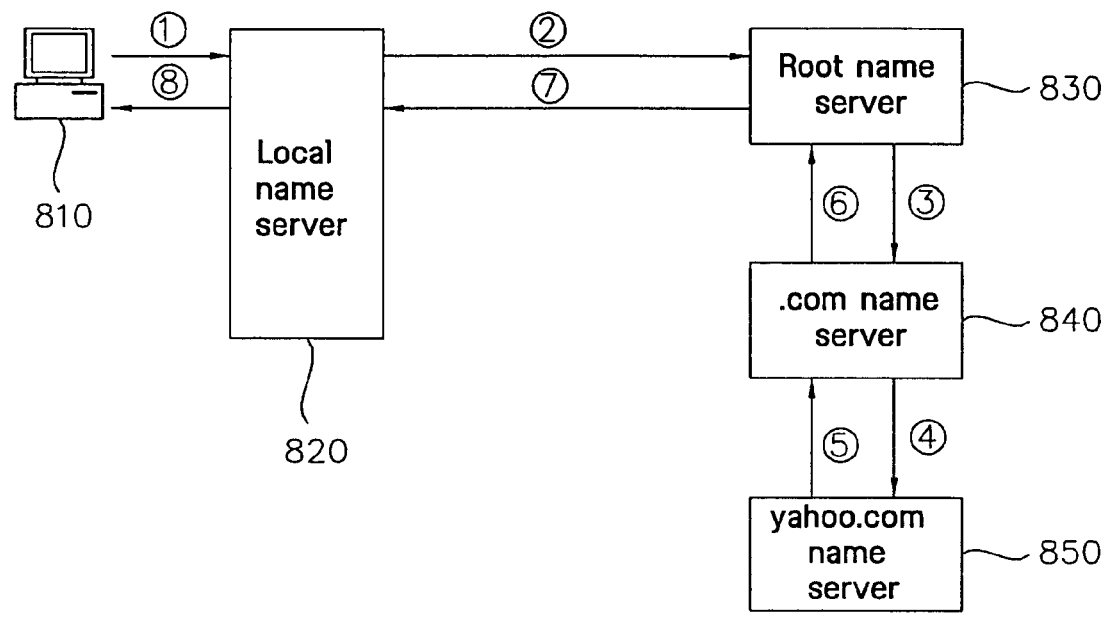
FIG. 5 is a block diagram showing a recursive mode of the domain name service according to present invention.

Next, in case of the recursive mode shown in FIG. 5, when the client 810 requests the local name server 820 to provide a domain name service using an IP address or a domain name as an input parameter (①), the local name server 820 first requests the root name server 830 to provide a domain name service in reverse order of the domain name (②).

The root name server 830 that has received the request sends a query message to name servers 840 and 850 having the sub-domain ".com" of the root name server 830 (③, ④).

This process is repeatedly performed until an address for the domain name is acquired. When an address is finally acquired, the final name server 850 sends the address to its higher-level domain server 840 (⑤). This process is repeated until the address is transmitted to the local name server 820 (⑥, ⑦).

Thereafter, the local name server 820 that has received the address sends the address for the requested domain name to the client 810 (⑧).

The domain name server-managing table according to the iterative and recursive modes, as shown in FIG. 6, contains hop counts (HCr) between the first to fourth edge routers 130, 140, 230 and 240 and the first to fourth domain name servers 110, 120, 210 and 220 included in the first and second external links 100 and 200; and hop counts (HCgd) between the first to fourth domain name servers 110, 120, 210 and 220 and an external gateway. According to an operating mode of the first to fourth domain name servers 110, 120, 210 and 220, i.e. iterative or recursive mode, the smallest hop counts between the first to fourth domain name servers 110, 120, 210 and 220 and the first to fourth edge routers 130, 140, 230 and 240 are calculated.

In FIG. 6, "I Mode" means iterative mode and "R Mode" means recursive mode.

The reason that the smallest hop counts for the iterative mode in FIG. 6 have not been determined is that the hop count varies depending on the length of a domain name in iterative mode and hop counts prior to the root name server 820 can be determined in recursive mode.

The address-managing unit 300 transmits addresses for domain name servers having the smallest hop counts with respect to each of the first to fourth edge routers 130, 140, 230 and 240 included in the first and second external links 100 and 200 for both iterative and recursive modes thereof. The addresses are cached in the first to fourth edge routers 130, 140, 230 and 240.

If a mobile host located at the home link 600 has moved to and has been located at the first or second external link 100 or 200, the moved mobile host requests one of the first to fourth edge routers 130, 140, 230 and 240 to which the mobile host has been connected to provide a domain name service.

The mobile host requests the domain name service while selecting the operating mode of the domain name server, i.e. iterative or recursive mode.

The edge router connected to the mobile host sets an address for the mode selected by the mobile host as a primary address and an address for the remaining mode as a secondary address, and then sends the addresses to the mobile host.

A domain name service method performed by the domain name service system constructed as above according to present invention will be described below.

Figure 7:
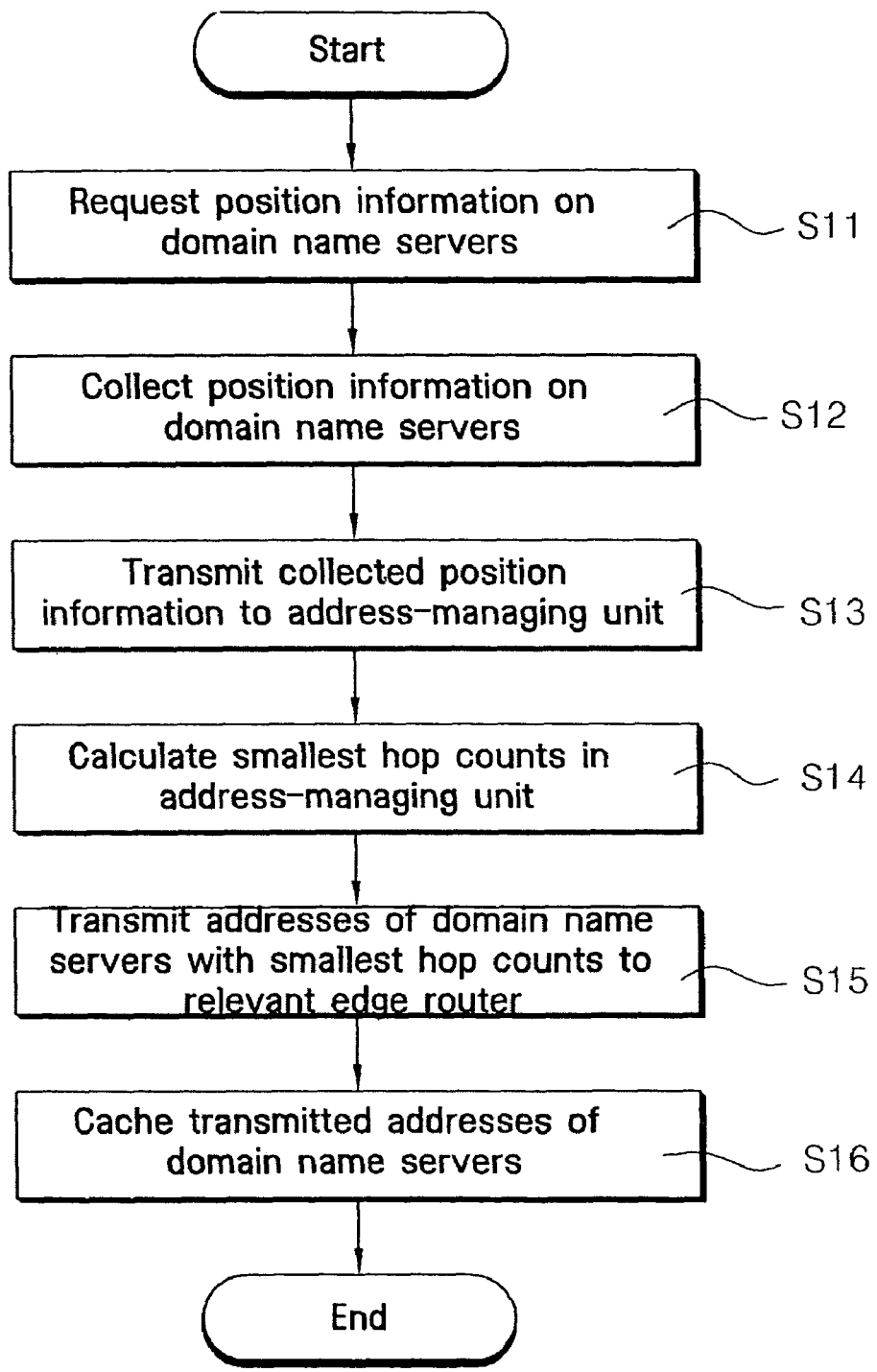
FIG. 7 is a flowchart illustrating a first embodiment of a domain name service method according to the present invention.

In the domain name service method illustrated in FIG. 7, the address-managing unit 300 first requests position information on the first to fourth domain name servers 110, 120, 210 and 220 included in the first and second external links 100 and 200 (S11).

In response to the request of the address-managing unit 300, the address-collecting unit 500 collects position information on the first to fourth domain name servers 110, 120, 210 and 220 included in the first and second external links 100 and 200 (S12).

The address-collecting unit 500 then transmits the collected position information to the address-managing unit 300 (S13).

The address-managing unit 300 acquires domain name servers having the smallest hop counts for the operating modes of the domain name servers, ie. iterative and recursive modes, from the first to fourth edge routers 130, 140, 230 and 240 based on the received position information. (S14).

At this time, the address-managing unit 300 calculates the smallest hop counts for the iterative and recursive modes based on the following formulas 1 and 2:

$$HCi = 2 \times HCgd \times Ldn + 2 \times HCdr,$$

$$DNSSPi = \{\text{Min}(HCdr)\} \text{ of } \{\text{Min}(HCgd) \text{ lists}\}, \tag{1}$$

where HCi is the hop count required in iterative mode, HCgd is the hop count between a gateway and a domain name server, HCdr is the hop count between a domain server and an edge router, DNSSPi is the smallest hop count in iterative mode, and Ldn is the length of a domain name.

A domain name service query message is transmitted from the first edge router 130 to the second domain name server 120 and a domain name service response message is transmitted from the second domain name server 120 to the first edge router 130. Therefore, the estimated hop count becomes 2×HCdr.

Further, since messages should be iteratively resent to the address-collecting unit 500 according to domain name, the estimated hop count becomes 2×HCdg×Ldn. As a result, formula 1 has been obtained.

In formula 2:

$$HCr = 2 \times HCgd + 2 \times HCdr$$

$$DNSSPr = \text{Min}(HCr) \tag{2}$$

where HCr is the hop count required in recursive mode, HCgd is the hop count between a gateway and a domain name server, HCdr is the hop count between a domain server and an edge router, and DNSSPr is the smallest hop count in recursive mode.

In formula 2, a domain name service query message is transmitted from the first edge router 130 to the second domain name server 120 and the first edge router 130 receives a response message from the second domain name server 120. Therefore, the estimated hop count becomes 2×HCdr.

Furthermore, since information is acquired through the Internet network 400, messages are exchanged between the second domain name server 120 and the address-collecting unit 500. Thus, the estimated hop count becomes 2×HCgd. Accordingly, formula 2 has been obtained.

Addresses of domain name servers having the smallest hop counts with respect to the first to fourth edge routers 130, 140, 230 and 240 are transmitted to the first to fourth edge routers 130, 140, 230 and 240 according to the smallest hop counts calculated in the address-managing unit 300 (S15).

The addresses of the domain name servers transmitted to the first to fourth edge routers 130, 140, 230 and 240 are cached therein, respectively (S16).

Figure 8:
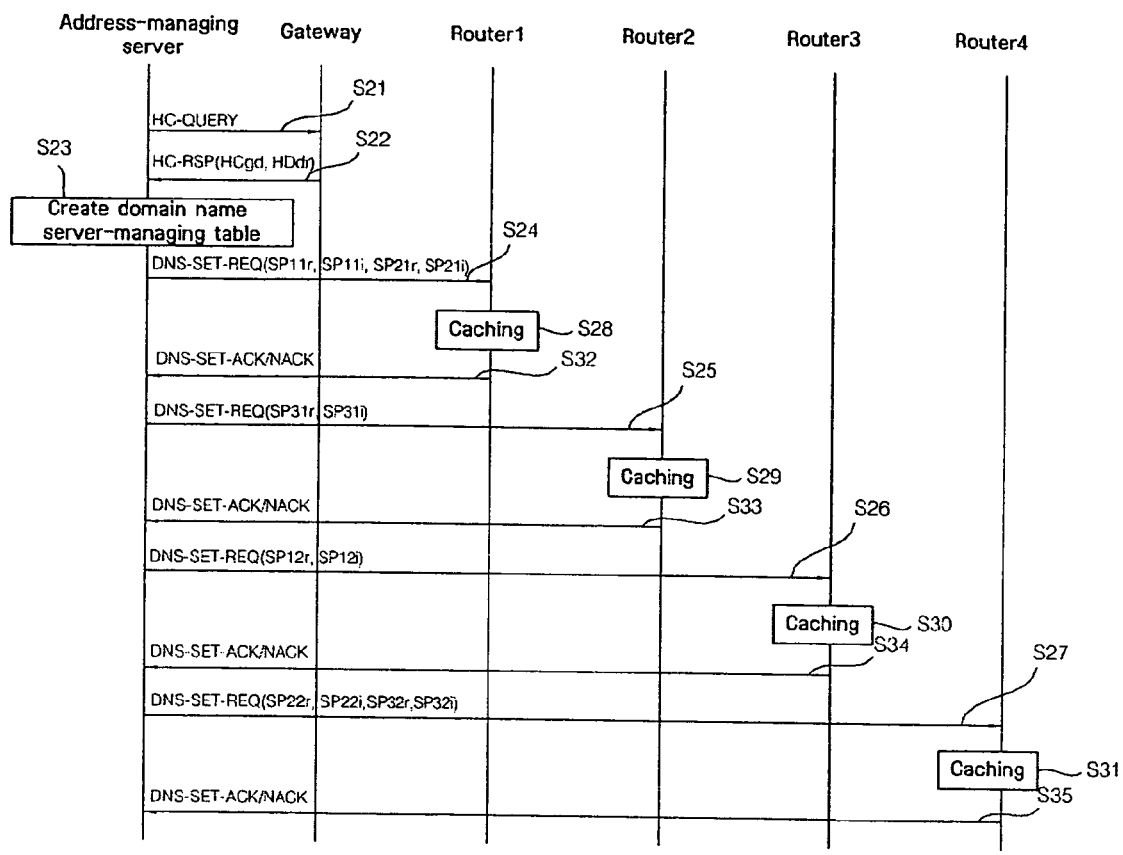
FIG. 8 is a view showing the flow of the domain name service according to present invention.

The domain name service method described above will be discussed in greater detail with reference to FIG. 8. The address-managing unit 300 requests the address-collecting unit 500 to transmit position information on the first to fourth domain name servers 110, 120, 210 and 220 (S21).

Figures 9, 10:
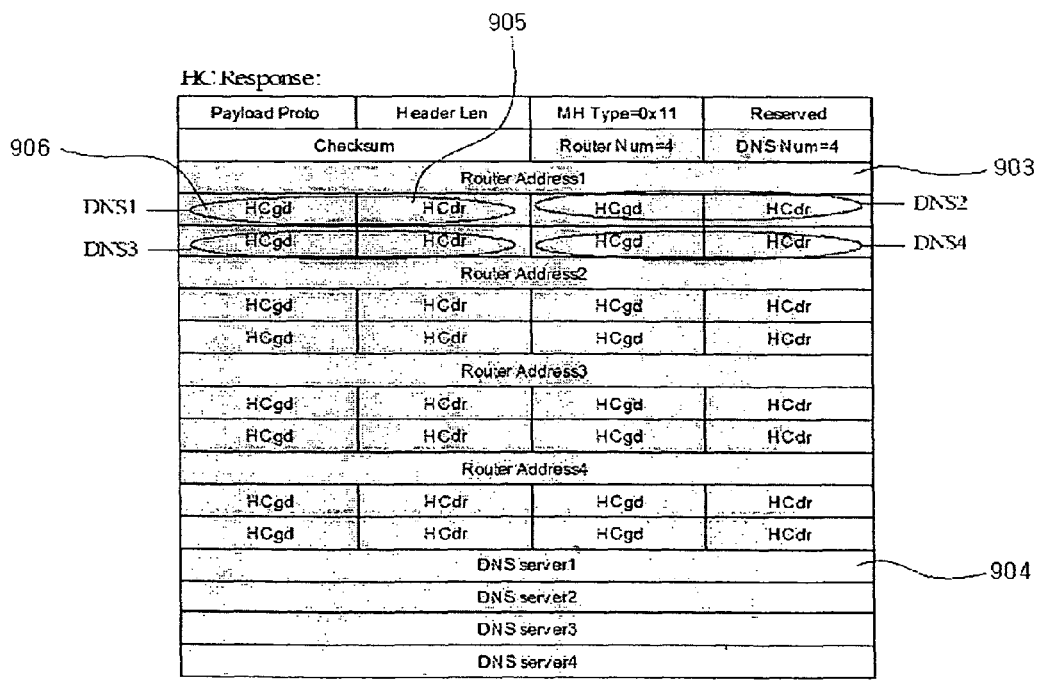
FIG. 9 is a view showing the structure of a request message of an address-managing unit according to present invention.
FIG. 10 is a view showing the structure of a domain name server position information message that is transmitted to the address-managing unit according to present invention.

As shown in FIG. 9, the request message transmitted to the address-collecting unit 500 may be a message that causes the address-collecting unit 500 to directly collect position information on the first to fourth domain name servers 110, 120, 210 and 220, or causes the first and second sub routers 150 and 250 of the first and second external links 100 and 200 to collect the position information and then send the collected position information to the address-collecting unit 500.

Therefore, M 901 in FIG. 9 indicates that the address-collecting unit 500 collects the position information by itself, and T 902 indicates that the first and second sub routers 150 and 250 collect the position information and then transmit it to the address-collecting unit 500.

The address-collecting unit 500 collects position information on the first to fourth domain name servers 110, 120, 210 and 220 in response to the request of the address-managing unit 300 and then transmits the collected position information to the address-managing unit 300 (S22).

A position information message transmitted to the address-managing unit 300 will be described. As shown in FIG. 10, the position information message contains an address 903 of each of the edge routers 130, 140, 230 and 240, a hop count 905 between each of the edge routers 130, 140, 230 and 240 and each of the domain name servers 110, 120, 210 and 220, and a hop count 906 between each of the domain name servers 110, 120, 210 and 220 and the address-collecting unit 500.

The position information message further contains an address 904 of each of the domain name servers 110, 120, 210 and 220.

The address-managing unit 300 creates a domain name server-managing table based on the position information received from the address-collecting unit 500 and calculates the smallest hop count between each of the edge routers 130, 140, 230 and 240 and each of the domain name servers 110, 120, 130 and 140 (S23).

After calculating the smallest hop counts, the address-managing unit 300 sends the edge routers 130, 140, 230 and 240 addresses of domain name servers having the smallest hop counts with respect to the respective edge routers (S24, S25, S26, S27).

The addresses of the domain name servers transmitted to the edge routers 130, 140, 230 and 240 are generally in a format of SP11*i* or SP11*r*. The first "1" of "11" indicates a cell number of one of the cells C1, C2, C3, C4, C5 and C6 connected to the edge routers 130, 140, 230 and 240, and the second "1" of "11" indicates the number of one of the external links. Furthermore, the final "i" and "r" indicate the iterative and recursive modes, respectively.

An address message of each of the domain name servers 110, 120, 210 and 220 contains a primary address 911 of the domain name server and a secondary address 912 thereof, as shown in FIG. 11.

When the addresses of the domain name servers 110, 120, 210 and 220 are transmitted to the edge routers 130, 140, 230 and 240, they are cached in the edge routers (S28, S29, S30 and S31).

The edge routers send relevant response messages to the address-managing server 300 (S32, S33, S34, S35).

Each response message contains a return value (RVAL) 921 according to the transmission of the addresses of the domain name servers, as shown in FIG. 12.

Figure 13:
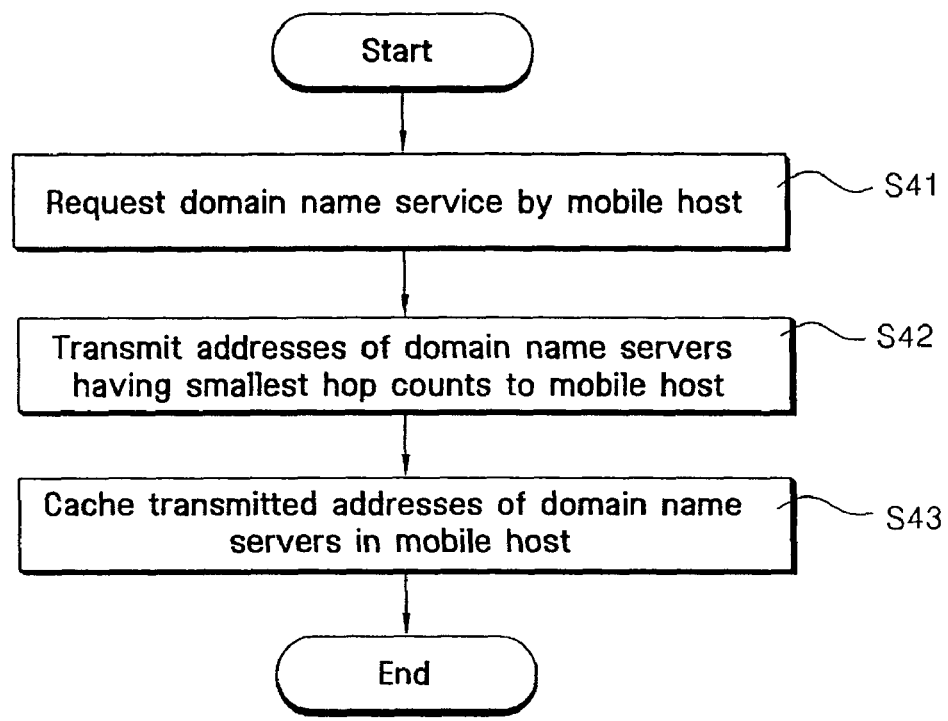
FIG. 13 is a flowchart illustrating a second embodiment of a domain name service method according to the present invention.

A domain name server service method wherein addresses of domain name servers having the smallest hop counts are cached in the edge routers 130, 140, 230 and 240 and a mobile host is connected to any one of the edge routers 130, 140, 230 and 240 will be described with reference to FIG. 13.

First, a mobile host that has moved from the home link 600 requests a domain name service through a given edge router connected thereto in the first external link 100 or the second external link 200 (S41).

In response to the request of the mobile host, the edge router connected to the mobile host transmits the address of a domain name server having the smallest hop count to the mobile host (S42).

The transmitted address of the domain name server is cached in the mobile host (S43).

Accordingly, the mobile host receives the domain name service through the cached address.

The domain name service method for the mobile host described above will be discussed in greater detail with reference to FIG. 14.

The mobile host first requests an edge router to provide a domain name service in an external link to which the mobile host has moved (S51). The mobile host makes the request while selecting an operating mode of a domain name server, i.e. iterative or recursive mode, when requesting the domain name service.

Figures 14, 15:
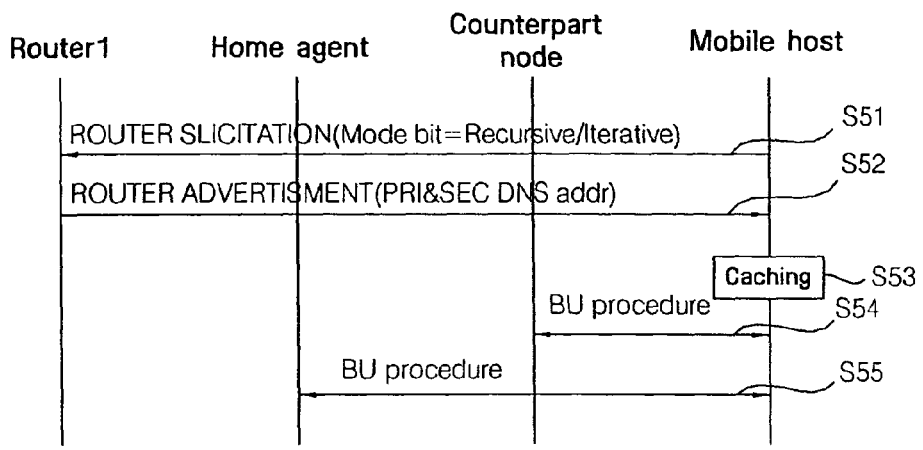
FIG. 14 is a view showing a first embodiment of the flow of a domain name service in a mobile host according to the present invention.
FIG. 15 is a view showing the structure of a domain name service request message of the mobile host according to present invention.

A mode request message of the mobile host is requested by selecting an operating mode 931 of the domain name server, as shown in FIG. 15. In FIG. 15, I/R/A means Iterative/Recursive/All.

In response to the request of the mobile host, the edge router sets an address of the mode requested by the mobile host as a primary address and then transmits it to the mobile host (S52).

Figures 16, 17:
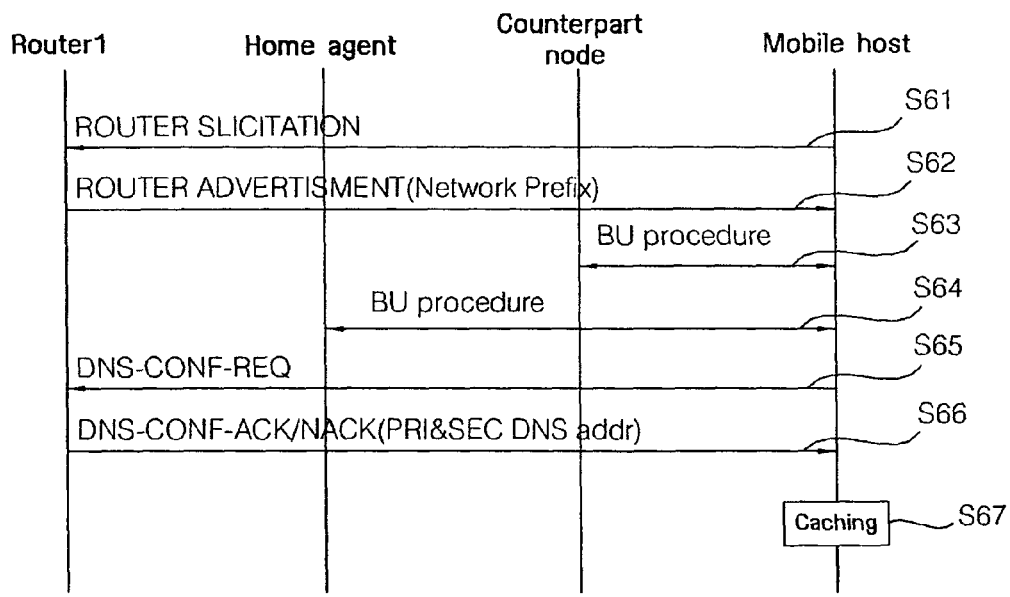
FIG. 16 is a view showing the structure of a domain name server address message that is transmitted from the edge router in response to a request of the mobile host according to present invention.
FIG. 17 is a view showing a second embodiment of the flow of the domain name service in the mobile host according to the present invention.

The message to be transmitted by the edge router is sent in a state where the address of the mode selected by the mobile host is set as the primary address 941 and an address of the remaining mode is set as a secondary address 942, as shown in FIG. 16.

The mobile host that has received the address of the domain name server from the edge router caches the address therein (S53).

Thereafter, the mobile host performs a binding update process together with the home agent 610 and the counterpart node 710 (S54, S55).

When the mobile host moves to the first or second external link 100 or 200, the mobile host makes connection through an existing domain name service and then receives an address of a domain name server having the smallest hop count with respect to a relevant edge router.

In such a process, as shown in FIG. 17, the mobile host first requests the domain name servers 630 and 640 in the home link 600 to provide a domain name service (S61).

In response to this request, the mobile host receives the addresses of the domain name servers 630 and 640 in the home link 600 (S62).

Then, the mobile host performs the binding update process together with the home agent 610 and the counterpart node 710 based on the received addresses of the domain name servers 630 and 640 (S63, S64).

Then, after the mobile host has moved to the first external link 100 or the second external link 200, it requests an edge router connected thereto to transmit a domain name service operating mode (S65).

The request message is transmitted in a state where an operating mode 951 of a domain name service is selected, as shown in FIG. 18 (S65). In FIG. 18, I/R/A means Iterative/Recursive/All.

The edge router connected to the moved mobile host transmits addresses of domain name servers having the smallest hop counts to the mobile host (S66).

The message transmitted from the edge router to the mobile host is transmitted in a state where an address for a mode selected by the mobile host is set as a primary address 961 and an address for the remaining mode is set as a secondary address 962, as shown in FIG. 19.

The addresses of the domain name servers transmitted to the mobile host are cached therein so that the mobile host can receive the domain name service (S67).

According to present invention described above, a domain name service can be provided through a mobile host and domain name servers having the smallest hop counts, based on position information on the domain name servers included in external links. Therefore, it is possible to provide a domain name service within a short time regardless of operating modes of the domain name servers. Furthermore, it is possible to reduce system traffic since the addresses of optimal domain name servers are provided to the edge routers.

The present invention has been described in connection with various illustrative embodiments as illustrated in the accompanying drawings, and it will be apparent to those skilled in the art that various modifications and changes can be made thereto without departing from the scope and spirit of the invention, as defined in the appended claims. Therefore, simple changes to the embodiments of the present invention will fall within the scope of the present invention.

What is claimed is:

1. A domain name service system, comprising:
an address-managing unit that requests position information on one or more domain name servers included in an external link of a network, and transmits the position information according to an operation mode of the one or more domain name servers to an edge router connected to a mobile host; and
an address-collecting unit that collects the position information on the one or more domain name servers received in response to the request,
wherein the position information includes one or more hop counts between the edge router and each of the domain name servers and one or more hop counts between each of the domain name servers and a gateway,
wherein the mobile host selects the operation mode of the one or more domain name servers and requests a domain name service to the edge router, and
wherein an address of the domain name server having a shortest distance according to the selected operation mode is provided.

2. The system as claimed in claim 1, wherein a smallest hop count according to an iterative mode of each of the domain name servers and a smallest hop count according to a recursive mode of each of the domain name servers are calculated based on the position information, and
a domain name server-managing table is created based on the position information and the calculated smallest hop counts.

3. The system as claimed in claim 2, wherein one or more addresses for the iterative mode and the recursive mode of the one or more domain name servers having the smallest hop counts with respect to the edge router are transmitted to the edge router.

4. A domain name service system comprising:
an address-managing unit that requests position information on one or more domain name servers included in an external link of a network, and transmits the position information to an edge router connected to a mobile host,
wherein the position information includes one or more hop counts between the edge router and each of the domain name servers and one or more hop counts between each of the domain name servers and a gateway,
wherein a smallest hop count according to an iterative mode of each of the domain name servers and a smallest hop count according to a recursive mode of each of the domain name servers are calculated based on the position information, and a domain name server-managing table is created based on the position information and the calculated smallest hop counts,
wherein one or more addresses for the iterative mode and the recursive mode of the one or more domain name servers having the smallest hop counts with respect to the edge router are transmitted to the edge router, and
wherein in the iterative mode, the smallest hop count is calculated based on:

$$HCi=2 \times HCgd \times Ldn + 2 \times HCdr,$$

$$DNSSPi=\{Min(HDdr)\} \text{ of } \{Min(HCgd)\text{lists}\},$$

where HCi is the hop count required in the iterative mode, HCgd is the hop count between the gateway and each of the domain name servers, HCdr is the hop count between each of the domain name servers and the edge router, DNSSPi is the smallest hop count in the iterative mode, and Ldn is the length of a domain name.

5. A domain name service system comprising:
an address-managing unit that requests position information on one or more domain name servers included in an external link of a network, and transmits the position information to an edge router connected to a mobile host,
wherein the position information includes one or more hop counts between the edge router and each of the domain name servers and one or more hop counts between each of the domain name servers and a gateway,
wherein a smallest hop count according to an iterative mode of each of the domain name servers and a smallest hop count according to a recursive mode of each of the domain name servers are calculated based on the position information, and a domain name server-managing table is created based on the position information and the calculated smallest hop counts,
wherein one or more addresses for the iterative mode and the recursive mode of the one or more domain name servers having the smallest hop counts with respect to the edge router are transmitted to the edge router, and
wherein in the recursive mode, the smallest hop count is calculated based on:

$$HCr=2 \times HCgd + 2 \times HCdr,$$

$$DNSSPr=Min(HCr),$$

where HCr is the hop count required in the recursive mode, HCgd is the hop count between the gateway and each of the domain name servers, HCdr is the hop count between each of the domain name servers and the edge router, and DNSSPr is the smallest hop count in the recursive mode.

6. A domain name service system, comprising:
an address-managing unit that requests position information on one or more domain name servers included in an external link of a network; and an address-collecting unit, connected between the external link of a network and an Internet network, that collects position information on the one or more domain name servers included in the external link, wherein if the mobile host is located at the external link, the position information includes one or more hop counts between an edge router and each of the domain name servers and one or more hop counts between each of the domain name servers and a gateway, and wherein an address of the domain name server having a shortest distance based on the hop counts according to a selected operation mode of the one or more domain name servers is provided when the mobile host selects the operation mode of the one or more domain name server and requests a domain name service to the edge router.

7. A domain name service system, comprising:

an address-collecting unit that collects the position information on one or more domain name servers; and an address-providing unit that transmits one or more addresses of the one or more domain name servers to a mobile host requesting a domain name service, wherein the one or more addresses respectively correspond to one or more domain name servers having the smallest hop counts with respect to the mobile host according to an operation mode of the one or more domain name servers selected by the mobile host, and wherein one or more of the addresses of one or more of the domain name servers include an address of at least one domain name server having the smallest hop count for an iterative mode and an address of at least one domain name server having the smallest hop count for a recursive mode.

8. The system as claimed in claim 7, wherein when the mobile host requests the domain name service, the mobile host selects an operating mode of the domain name service.

9. A domain name service method, comprising:

requesting position information on one or more domain name servers included in a network;

transmitting the position information on one or more domain name servers having the smallest hop counts with respect to an edge router connected to a mobile host, to the edge router; and providing an address of the domain name server having a shortest distance based on the hop counts according to an operation mode of the one or more domain name servers when the mobile host selects the operation mode of the domain name server and requests a domain name service to the edge router.

10. The method as claimed in claim 9, wherein the position information includes hop counts between the edge router and each domain name server and hop counts between each domain name server and a gateway.

11. The method as claimed in claim 10, wherein the step of transmitting the position information comprises:

a first process of transmitting an address of a domain name server, which has the smallest hop count with respect to the edge router, to the edge router; and a second process of allowing the address of the domain name server transmitted in the first process to be cached in the edge router.

12. The method as claimed in claim 11, wherein the smallest hop count is calculated according to each of the operating modes of the domain name server.

13. The method as claimed in claim 11, wherein the addresses transmitted to the edge router include at least one address for an iterative mode and a recursive mode.

14. A domain name service method, comprising:

transferring a request for position information on one or more domain name servers included in an external link; and collecting and storing the position information on one or more domain name servers in response to the request;

wherein the position information includes one or more hop counts between the edge router and each of the domain name servers and one or more hop counts between each of the domain name servers and a gateway, wherein the mobile host selects an operation mode of the one or more domain name servers and requests a domain name service to the edge router, and wherein an address of the domain name server having a shortest distance based on the hop counts according to the selected operation mode is provided.

15. The method as claimed in claim 14, wherein the step of collecting and storing the position information includes allowing a gateway connected between the external link and an Internet network to collect and store the position information.

16. The method as claimed in claim 14, wherein the step of collecting and storing the position information comprises:

a first process, wherein a sub router for connecting the external link to the gateway collects the position information; and a second process for causing the position information collected in the first process to be stored in the gateway.

17. A domain name service method, comprising:

requesting by a mobile host a domain name service due to changes in a link to which the mobile host is connected;

transmitting to the mobile host at least one address of at least one domain name server having the smallest hop counts with respect to an edge router connected to the mobile host, in response to the request; and providing an address of the domain name server having a shortest distance based on the hop counts according to an operation mode of the one or more domain name servers when the mobile host selects the operation mode of the domain name server and requests a domain name service to the edge router.

18. The method as claimed in claim 17, the step of requesting a domain name service comprising:

requesting the edge router connected to the mobile host in the changed link to provide the domain name service.

19. The method as claimed in claim 17, the step of transmitting an address of a domain name server comprising:

a first process of transmitting at least one address of at least one domain name server having the smallest hop counts with respect to the edge router to the mobile host in response to the request; and a second process of causing the transmitted addresses to be cached in the mobile host.

20. The method as claimed in claim 17, the step of requesting a domain name service comprising:

a first process of requesting a domain name server, which is included in a first link to which the mobile host was connected before the link is changed, to provide the domain name service; and a second process of providing the domain name service through the domain name server in the first process.

21. The method as claimed in claim 20, the step of transmitting an address of a domain name servers comprising:

a first process of requesting the edge router, which is included in the changed link after the link is changed, to provide the domain name service;

a second process of transmitting at least one address of at least one domain name server having the smallest hop counts with respect to the edge router in the first process to the mobile host; and a third process of causing the transmitted address or addresses to be cached in the mobile host.

22. A domain name service system, comprising:

an address-managing unit, and an address-collecting unit that communicates with the address-managing unit, wherein the address-managing unit requests position information on domain name servers included in an external link of a network, and transmits the position information to an edge router connected to a mobile host when the mobile host is moved to the external link, wherein the address-collecting unit collects the position information on the domain name servers and provides the position information to the address-managing unit when the mobile host is moved to the external link, wherein if the mobile host is located at the external link, the position information includes one or more hop counts between an edge router and each of the domain name servers and one or more hop counts between each of the domain name servers and a gateway, wherein the mobile host selects an operation mode of the one or more domain name servers and requests a domain name service to the edge router, and wherein an address of the domain name server having a shortest distance based on the hop counts according to the selected operation mode is provided.

23. A domain name service method, comprising:

collecting position information on one or more domain name servers included in an external link; and selecting at least one of the domain name servers to provide domain name service to a mobile host based on the collected position information, wherein the mobile host selects an operation mode of the one or more domain name servers and requests a domain name service to an edge router, wherein an address of the selected domain name server having a shortest distance based on hop counts according to the selected operation mode is provided when the mobile host selects the operation mode of the domain server and requests a domain name service to the edge router, and wherein the selected domain name server has the smallest hop counts with respect to the edge router connected to the mobile host.

24. A domain name service system, comprising:

an address-managing unit that requests position information on one or more domain name servers included in an external link of a network and transmits the position information according to an operation mode of one or more domain name servers to an edge router connected to a mobile host; and an address-collecting unit, connected between the external link of a network and an Internet network, that gathers position information on the one or more domain name servers included in the external link, wherein an address of the domain name server having a shortest distance based on hop counts according to the selected operation mode of the one or more domain name servers is provided when a mobile host selects the operation mode of the domain name server and requests a domain name service to the edge router, wherein the domain name server of which the address is provided, has the smallest hop counts with respect to the edge router connected to the mobile host.

25. The system as claimed in claim 24, wherein if the mobile host is located at the external link, the position information includes one or more hop counts between an edge router and each of the domain name servers and one or more hop counts between each of the domain name servers and a gateway.

* * * * *